(12) United States Patent
Alkandari et al.

(10) Patent No.: US 12,441,277 B1
(45) Date of Patent: Oct. 14, 2025

(54) SYSTEMS AND METHODS FOR AUTOMATED WASHING OF VARIOUS VEHICLE TYPES

(71) Applicant: Kuwait University, Safat (KW)

(72) Inventors: Dheyaa Alkandari, Safat (KW);
Abdullah S. Al Mekhyal, Safat (KW);
Hanan H. Al Kandari, Safat (KW);
Khawla A. Alshatti, Safat (KW);
Haneen S. Albawi, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 18/926,194

(22) Filed: Oct. 24, 2024

(51) Int. Cl.
*B60S 3/04* (2006.01)
*B08B 3/02* (2006.01)
*B08B 3/08* (2006.01)
*B08B 5/02* (2006.01)
*B08B 13/00* (2006.01)

(52) U.S. Cl.
CPC ............... *B60S 3/04* (2013.01); *B08B 3/024* (2013.01); *B08B 3/08* (2013.01); *B08B 5/02* (2013.01); *B08B 13/00* (2013.01); *B08B 2203/0217* (2013.01)

(58) Field of Classification Search
CPC ... B60S 3/04; B08B 3/024; B08B 3/08; B08B 5/02; B08B 13/00; B08B 2203/0217
See application file for complete search history.

(56) References Cited

U.S. PATENT DOCUMENTS

| | | |
|---|---|---|
| 2,676,600 A | 4/1954 | Vani et al. |
| 3,167,797 A | 2/1965 | Hergonson |
| 3,422,827 A | 1/1969 | McCulloch |
| 3,604,434 A | 9/1971 | Hurst |
| 4,848,383 A | 7/1989 | Buhler |
| 4,933,016 A | 6/1990 | Carlson |

(Continued)

FOREIGN PATENT DOCUMENTS

| | | | |
|---|---|---|---|
| CN | 106228704 A | 12/2016 | |
| EP | 302964 A | * 2/1989 | ............... B60S 3/04 |

OTHER PUBLICATIONS

CN 221660705 U (Year: 2024).*

(Continued)

*Primary Examiner* — Alexander Markoff
(74) *Attorney, Agent, or Firm* — Nath, Goldberg & Meyer; Joshua B. Goldberg

(57) ABSTRACT

A system for automated vehicle washing uses a spray arm having horizontal and vertical arm portions joined orthogonally to each other. The spray arm performs various cleaning operations including detergent dispensing, water rinsing and air drying, and is in fluid connection to respective reservoirs and dispensers of detergent, water, and compressed air. A support frame is configured for movement of the spray arm thereon. Means are included for two-dimensional horizontal movement, rotational movement, and vertical movement of the spray arm. A controller of the system is configured to raise or lower the spray arm between an upper height and lower height to accommodate a variety of vehicle types and sizes. A control interface may be in the form of a mobile application and operated by a touchscreen device. The spray arm may include ultrasonic proximity sensors mounted thereon for automated operation.

18 Claims, 7 Drawing Sheets

(56) References Cited

U.S. PATENT DOCUMENTS

| | | | | |
|---|---|---|---|---|
| 6,502,765 | B1* | 1/2003 | Chase | B60S 3/04 |
| | | | | 239/751 |
| RE40,463 | E | 8/2008 | Belanger et al. | |
| 8,443,818 | B2 | 5/2013 | Belanger et al. | |
| 2009/0211605 | A1* | 8/2009 | Ahmad | B60S 1/528 |
| | | | | 134/123 |
| 2009/0272409 | A1* | 11/2009 | Petit | B05B 3/14 |
| | | | | 239/548 |
| 2010/0186778 | A1* | 7/2010 | Martin | B08B 3/024 |
| | | | | 134/113 |
| 2024/0083393 | A1 | 3/2024 | Nana | |

OTHER PUBLICATIONS

CN 117864065 A (Year: 2024).*
WO 2007012292 A1 (Year: 2007).*
KR 102544190 B1 (Year: 2023).*
CN 118769946 (Year: 2024).*
CN 118238645 (Year: 2024).*
CN 116923327 (Year: 2023).*
CN 102312591 (Year: 2012).*
CN 105946809 (Year: 2017).*

* cited by examiner

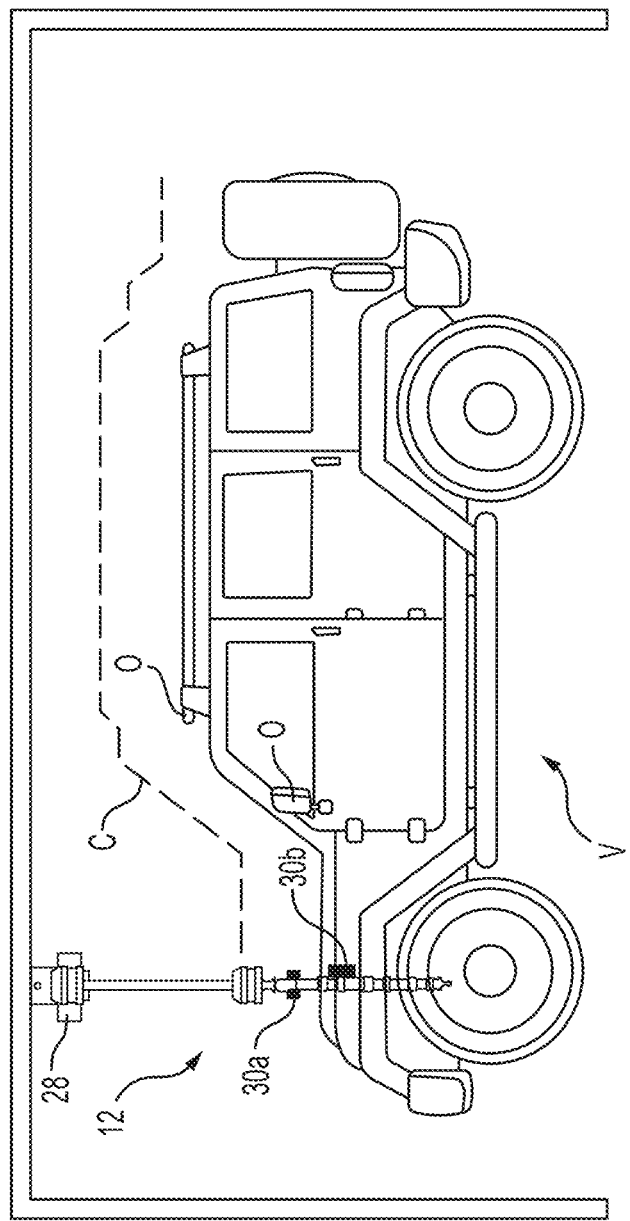
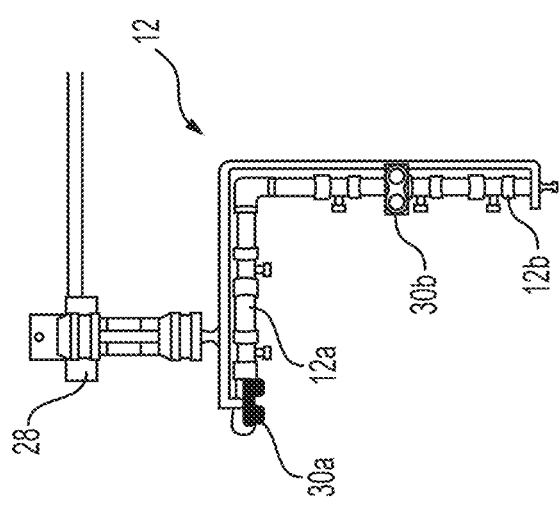
FIG. 3A
FIG. 3B

SYSTEMS AND METHODS FOR AUTOMATED WASHING OF VARIOUS VEHICLE TYPES

BACKGROUND

Field

The disclosure of the present patent application relates to car washing equipment, and particularly to an automated multi-car wash and control system therefor.

Description of Related Art

Car washing is often desirable and necessary in desert regions such as Kuwait due to the accumulation of dust and sand, which can cover vehicles and lead to a dull appearance and scratch paintwork if not regularly cleaned. Oxidation can also occur on the paint if the combination of dust, sand, and other pollutants are not cleaned off regularly. Typically, for most people, the options for washing their cars include taking the car to a commercial car wash or washing it themselves at home with a hose and bucket. Each of these methods is not ideal and has its own inconveniences. Commercial car washes often require a lengthy drive from a person's home, as well as a lengthy wait in line if many people are washing their car at the same time. Also, unless a person has additional help to drive another vehicle, they can only wash one of their vehicles at a time if using a commercial car wash. On the other hand, washing their cars at home using a bucket and hose is much more labor intensive than simply using an automated, commercial car wash.

In addition, conventional car washes are designed for a standard vehicle height, often leading to larger vehicles (e.g., SUVs, trucks, or buses) or smaller vehicles (compact cars) improperly cleaned. Taller vehicles may not fit in an automated wash, while shorter vehicles may not be washed effectively. In other words, larger vehicles may risk damage if they try to fit into a car wash with a height limit that is too low. Conversely, fixed-height systems may not reach every part of smaller vehicles, leaving some areas dirty.

Thus, a multi-car automated washing system solving the aforementioned problems is desired.

SUMMARY

A system for automated vehicle washing is disclosed herein. The vehicle washing system includes a spray arm having a horizontal arm portion and a vertical arm portion joined orthogonally to each other. The spray arm is configured to perform various cleaning operations on a vehicle including detergent dispensing, water rinsing and air drying, and is in fluid connection to respective reservoirs and dispensers of detergent, water, and compressed air. A support frame is included and is configured for movement of the spray arm thereon and for holding the spray arm in an elevated position. Means are included for two-dimensional movement of the spray arm along the support frame within a horizontal plane parallel to ground level. In addition, means are included for rotational movement of the spray arm about a vertical axis. Furthermore, the system includes means for vertical movement of the spray arm along a vertical axis and a controller configured to raise or lower the spray arm between a respective upper height and lower height to accommodate cleaning of a variety of vehicle types.

In a non-limiting example, the means for vertical movement of the spray arm may include a linear actuator connecting the spray arm to the support frame. In addition, the spray arm may include a first proximity sensor pointed downward toward the ground and mounted on the horizontal arm portion and a second proximity sensor facing forward in the direction of travel of the spray arm and mounted on the vertical arm portion. Furthermore, the spray arm may move vertically in response to a sensed distance between the spray arm and a vehicle being washed such that the spray arm adjusts its vertical height in correspondence to vertical contours of the vehicle being washed.

The vehicle washing system may include a control interface in the form of a mobile application whereby a user may specify cleaning operations to be performed on a vehicle. The control interface may allow a user to specify the number of vehicles to be washed and the location of the vehicles from a plurality of designated parking spaces positioned under the support frame. A plurality of parking spot sensors may be included and configured to sense a vehicle presence and location among the designated parking spaces. The parking spot sensors may be configured to sense a vehicle that is parked incorrectly among the designated parking spaces and generate an error message to a user through the control interface.

In a further non-limiting example, a user may specify a day and time through the control interface for the cleaning operations to be performed. In addition, a user may specify a day and time for multiple vehicles among the plurality of designated parking spots for cleaning operations to be performed.

As well as the system described, a method of automated vehicle washing is set forth by the present disclosure. The method includes specifying cleaning instructions through a control interface, which may be a displayed on a touchscreen mobile device. The cleaning instructions are selected from cleaning options including detergent washing, water rinsing, and air drying. The cleaning instructions are executed on a vehicle through a spray arm, the spray arm being in fluid connection to respective reservoirs and dispensers of detergent, water and compressed air. The spray arm includes a horizontal arm portion and a vertical arm portion joined orthogonally to each other. The method includes moving the spray arm along a support frame two-dimensionally within a horizontal plane parallel to ground level, rotating the spray arm about a vertical axis, and moving the spray arm vertically between an upper height and a lower height to accommodate cleaning operations on a variety of vehicle types.

The method disclosed herein may further include sensing a vehicle distance through at least one proximity sensor located on the spray arm and adjusting a vertical height of the spray arm in response to the vehicle distance to maintain a constant distance between the spray arm and the vehicle along various contours of the vehicle. The spray arm may include a first proximity sensor facing downward on the horizontal portion and a second proximity sensor facing forward in the direction of travel and mounted on the vertical arm portion. The proximity sensors may be, for example, ultrasonic proximity sensors.

The method may further include specifying through the control interface a number of vehicles to be washed and a location of the vehicles from a plurality of designated parking spaces. A vehicle presence and location among the designated parking spaces may be sensed through a plurality of parking spot sensors, which may be ultrasonic proximity sensors. The parking spot sensors may be configured to sense a vehicle parked incorrectly among the designated parking spaces and generate an error message to a user through the control interface.

A user may specify a day and time through the control interface for the cleaning operations to be performed using the control interface. A user may further specify a day and time for multiple vehicles among a plurality of designated parking spots for cleaning operations to be performed.

These and other features of the present subject matter will become readily apparent upon further review of the following specification.

BRIEF DESCRIPTION OF DRAWINGS

FIG. 3A is a front view of a spray arm used in a system for automated vehicle washing.

FIG. 3B is a side view of a spray arm adapting to vertical vehicle contours in a cleaning operation.

Similar reference characters denote corresponding features consistently throughout the attached drawings.

DETAILED DESCRIPTION

Definitions

Figure 1:
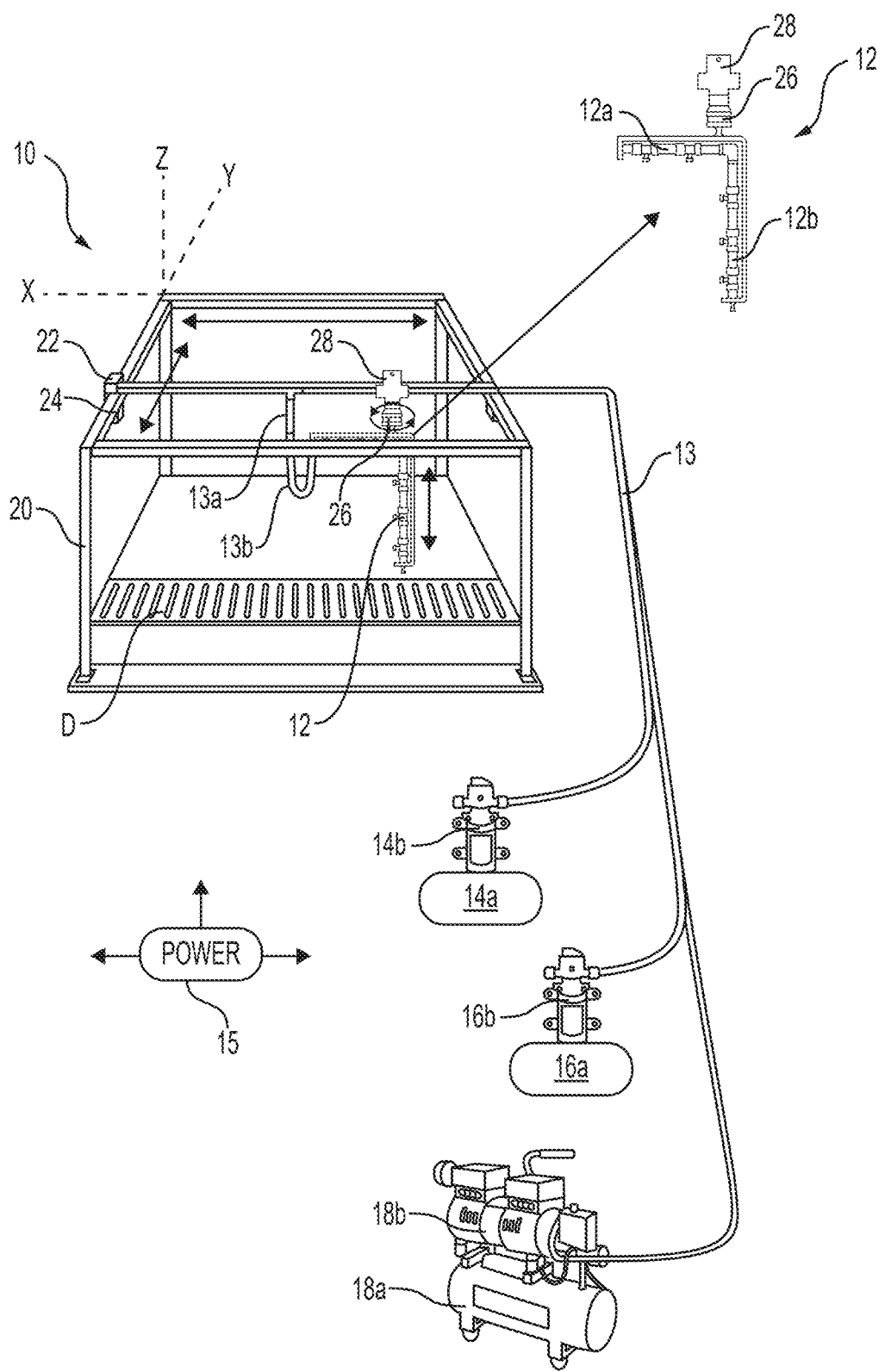
FIG. 1 is a perspective view of a system for automated vehicle washing.

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

With reference to FIG. 1, a system 10 for automated vehicle washing is disclosed herein. The vehicle washing system 10 includes a spray arm 12 having a horizontal arm portion 12a and a vertical arm portion 12b which are joined orthogonally to each other. The spray arm 12 is configured to perform various cleaning operations on a vehicle including detergent dispensing, water rinsing and air drying, and is in fluid connection or fluid communication, through conduits 13 to reservoirs 14a, 16a, 18a and pumps/dispensers 14b, 16b, 18b of detergent, water, and compressed air, respectively. One or more power sources 15 may be used to power system 10 and may include a combination of grid, solar, battery and/or other power sources. A support frame 20 is included on which the spray arm 12 is movably mounted and is configured for movement of the spray arm 12 and for holding the spray arm 12 in an elevated position. Conduits 13 may be a combination of rigid piping and flexible hoses, with appropriate support mounts and slack clearances for the flexible hose portions to allow movement of the spray arm 12 along support frame 20 while maintaining a supply connection to reservoirs 14a, 16a, 18a. Examples of conduits using a combination of flexible hosing and rigid piping with appropriate mounts and slack clearances are known and can be found in, for example, U.S. Pat. Nos. 2,676,600 A and 3,167,797 A, which are herein incorporated by reference.

Means 22, 24 are included for two-dimensional movement of the spray arm 12 along the support frame 20 within a horizontal, or X-Y, plane parallel to ground level. Means 22, 24 may be motors forming part of a series of linear actuators, such as screw actuators. However, means 22, 24 could also be motors forming part of a roller and guide rail system, trolley and carriage system, or other known systems as shown in, for example, U.S. Pat. Nos. 3,422,827 A, 3,604,434 A, or 4,933,016 A which are herein incorporated by reference. Means 22 may be for example a motor driving movement along the X-axis while means 24 may be a motor driving movement along the Y-axis.

In addition, means 26 are included for rotational movement of the spray arm 12 about a vertical axis, or Z-axis. Means 26 may be, for example, a motor and gearing arranged in a housing and configured to rotate spray arm 12. However, other known systems may be used for rotation of spray arm 12, such as may be found in the reference patents previously listed. Each of the previous patents are incorporated herein by reference. Furthermore, the system 10 includes means 28 for vertical movement of the spray arm along a vertical axis, or Z-axis, perpendicular to the ground. In a non-limiting example, means 28 for vertical movement of the spray arm may include a linear actuator such as a telescopic actuator connecting the spray arm 12 to the support frame 20.

Figure 2:
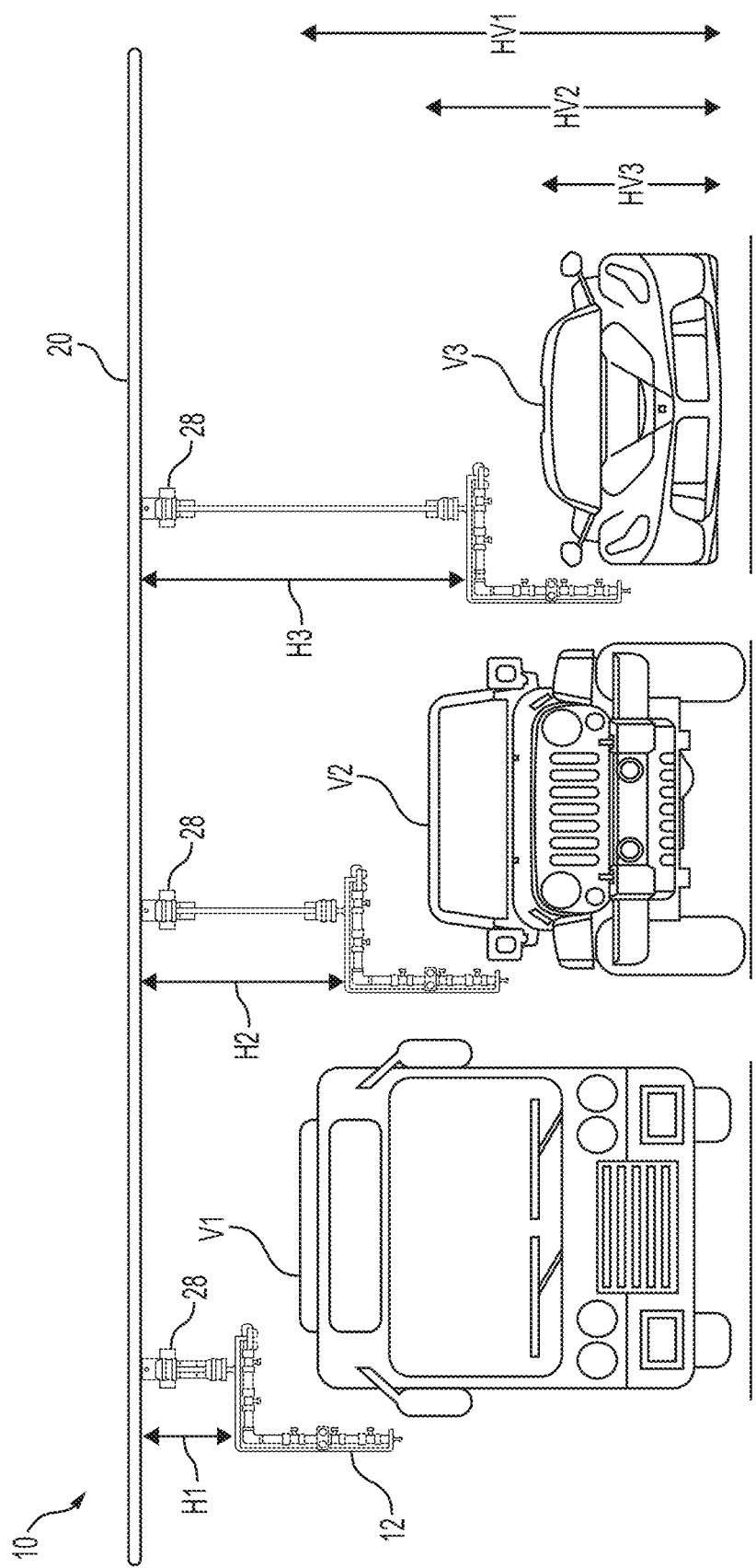
FIG. 2 is an environmental front view of the system for automated vehicle washing in use on a variety of vehicle types.

Turning to FIG. 2, means 28 for vertical movement is used to raise or lower spray arm 12 between a respective upper height H1 and lower height H3 to accommodate cleaning of a variety of vehicle types V1-V3, with intermediate height H2 being between H1 and H3. In the non-limiting example of FIG. 2, vehicle V1 is a bus, with an overall average height HV1 of about 10-12 feet, vehicle V2 is a sport utility vehicle (SUV) with an overall average height HV2 of about 5.5-6.2 feet, and vehicle V3 is a performance sportscar with an average height HV3 of about 3.8 ft-4.2 ft. Although not shown, semi-trailer trucks with an overall height of about 13-14 feet are another vehicle type that would benefit from system 10.

In certain embodiments, system 10 may be configured for servicing various types of vehicles with heights ranging between about 3.8-14 ft, with a suitable frame 20 configured and sized to accommodate the range of vehicle heights. In other embodiments, system 10 may be sized and configured for servicing vehicles with a range of heights such as about 3.8-12 ft, about 3.8-10 ft, about 3.8-6.2 ft, about 5.5-6.2 ft, about 5.5-10 ft, about 5.5-12 ft, about 5.5-14 ft, about 10-12 ft, and/or about 10-14 ft and all ranges therebetween.

Turning to FIG. 3A, the spray arm 12 may include at least one proximity sensor for sensing a distance between the spray arm 12 and a vehicle V. In a non-limiting example, two proximity sensors 30a, 30b in the form of ultrasonic sensors are mounted on spray arm 12. The use of ultrasonic sensors as proximity sensors is advantageous due to the wide scanning angle provided thereby, which can reach up to 30°. However, other types of proximity sensors may be included in place of, or in addition to, ultrasonic sensors. Sensor 30a is fixed on horizontal arm portion 12a and faces downward to measure a vehicle height which results in an adjustment to the height of spray arm 12 through means 28. Spray arm 12 may move vertically, as shown in FIG. 3B, in response to a sensed distance between the spray arm 12 and a vehicle V being washed such that the spray arm adjusts its vertical height in correspondence to vertical contours C of the vehicle being washed. A second sensor 30b may be mounted on vertical arm portion 12b of spray arm 12 and, together with sensor 30a, act as the "eyes" of the spray arm, continuously monitoring for obstacles O, and signaling the system to halt operation and/or change course as needed. Although two sensors 30a, 30b are shown, other embodiments could include less or more sensors, such as three, four or more sensors. For example, dual sensors may be mounted on the horizontal and/or vertical arm portion facing in opposite directions or four sensors may be mounted on the horizontal and/or vertical arm portion arranged to scan a full 360° view around the horizontal and/or vertical arm portions.

Figure 4:
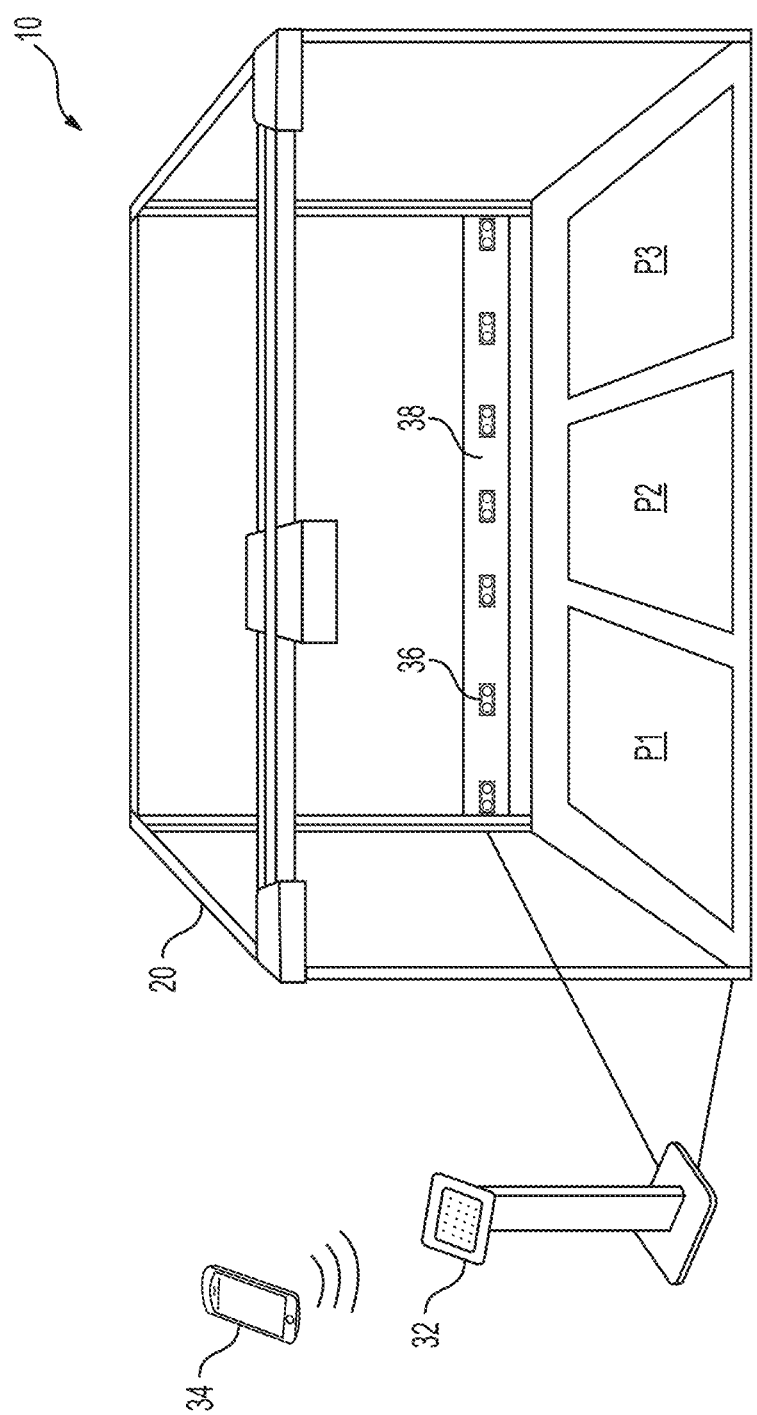
FIG. 4 is a perspective view of a support frame equipped with sensors, controller and designated parking spots used in an automated vehicle washing system.

Turning to FIG. 4, the vehicle washing system 10 may include a controller 32 whereby a user may specify cleaning operations to be performed on a vehicle. In addition, controller 32 may be operated remotely in the form of a mobile application accessed through a touchscreen mobile device 34. Mobile device 34 and controller 32 may be connected over the internet, a Bluetooth connection or other wireless connection. The controller 32 and mobile application may allow a user to specify the number of vehicles to be washed and the location of the vehicles from a plurality of designated parking spaces P1-P3 positioned under the support frame 20. One or more parking spot sensors 36, such as ultrasonic proximity sensors, may be included in system 10 and configured to sense a vehicle presence and location among the designated parking spaces P1-P3.

In a non-limiting example, parking spot sensors 36 are mounted within a crossbeam 38 on support frame 20 and in the example shown, three sensors per parking space P1-P3 are shown in a scanning position to monitor the center, left and right positions of a vehicle relative to its respective parking space, thus ensuring accurate vehicle position assessment. As used herein, "parking spot" and "parking space" are used interchangeably to indicate a location where a vehicle can be parked under support frame 20. Parking spot sensors 36 may detect an incorrectly parked vehicle by sensing, for example, if a vehicle is parked on a demarcated parking spot line and/or too far away or too close from a demarcated parking space boundary.

The parking spot sensors, however, may be positioned in other ways and locations, for example within designated posts or parking blocks (not shown) positioned in front of each parking spot. In addition, other sensing means such as weight sensors in the floor or other types of proximity sensors such as infrared or photoelectric sensors may be used as the parking spot sensors. However, as with the spray arm sensors, ultrasonic sensors are advantageous due to the large scanning area provided relative to other types of proximity sensors.

Figure 5:
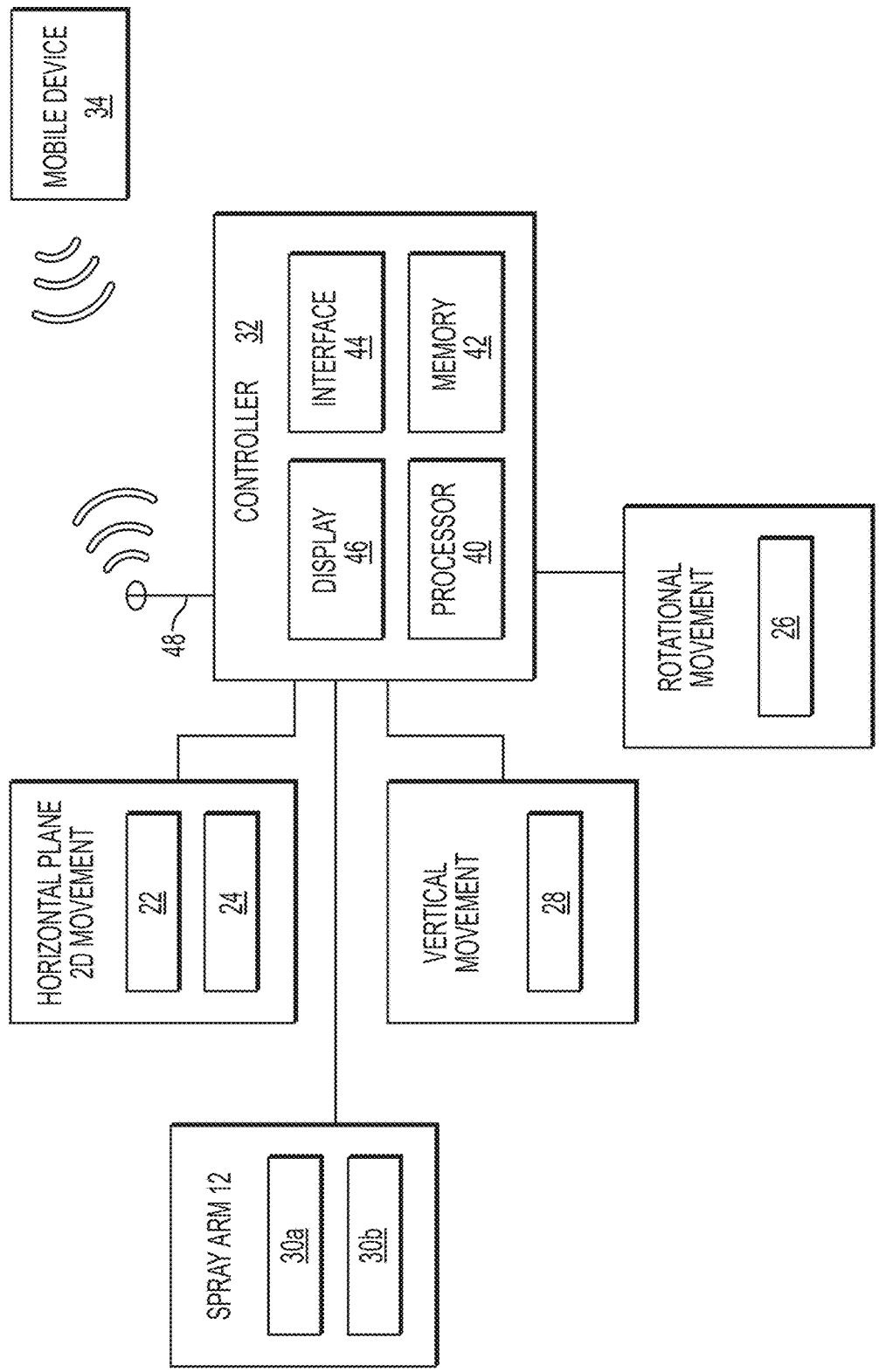
FIG. 5 is a block diagram representation of electronic hardware components used in a system for automated vehicle washing.

Turning to FIG. 5, controller 32 as shown may be in communication with the various sensors and means for motion of spray arm 12, including spray arm sensors 30a, 30b, means 22, 24 for horizontal two-dimensional movement, means 28 for vertical movement, and means 26 for rotational movement. Controller 32 is configured to control the system components and move spray arm 12 about different vehicle types and different vehicle contours. Controller 32 may be equipped with one or more processors 40, as well as memory components 42, interfaces 44, displays 46, and wireless transmitters and receivers, represented at 48. Examples of the processor 40 may include, but are not limited to, a general-purpose processor, a central processing unit (CPU), a microprocessor, a digital signal processor (DSP), a controller, a microcontroller, a state machine, a programmable logic controller, logical control circuitry or the like. The memory components 42 include, but are not limited to, the following non-transitory computer readable media: random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, or any other suitable type of non-transitory media. Interface 44 may be any suitable type of interface allowing the system components to operate, and may include, but are not limited to, a combination of buttons, switches, touchscreens, keyboards or the like. Display 46 may be any necessary displays or other types of visual indicators for operators of the system, including, but not limited to, computer monitor displays, LED displays, liquid crystal displays, touchscreen displays and the like. As is known, mobile device 34 may include the same or similar hardware components as control 32 including processors, memory, display, interfaces, wireless transmitters/receivers and the like.

Figure 6C:
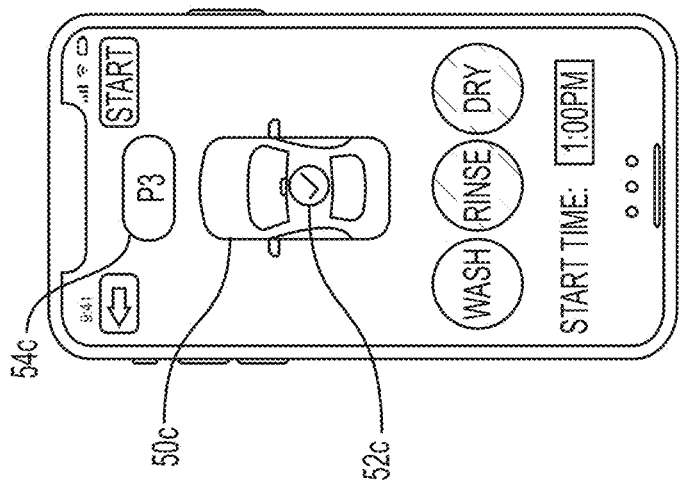
FIG. 6C is a mobile application interface for a system of automated vehicle washing with a status indicator of a correctly parked vehicle.
Figure 6B:
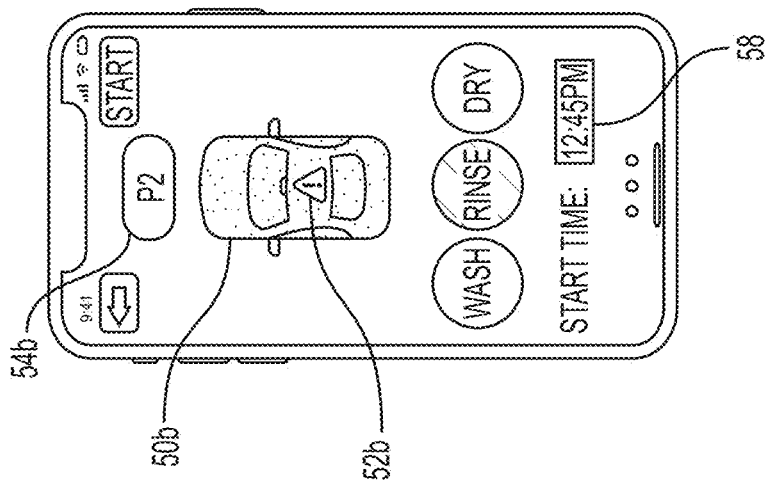
FIG. 6B is a mobile application interface for a system of automated vehicle washing with a status indicator of an incorrectly parked vehicle.
Figure 6A:
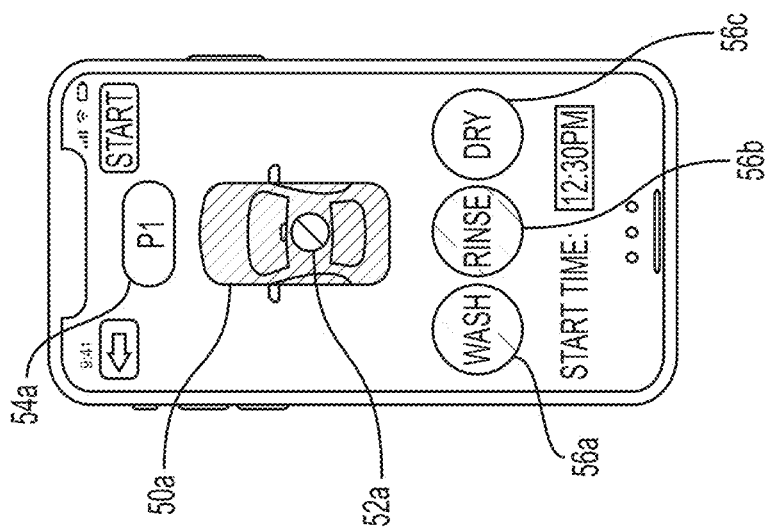
FIG. 6A is a mobile application interface for a system of automated vehicle washing with a status indicator of a missing vehicle.

Turning to FIG. 6A-C, examples are shown of the system control interface displayed as a mobile application in use on a touchscreen device. The parking spot sensors 36 of FIG. 4 may be configured to sense a vehicle that is parked incorrectly among the designated parking spaces, which may be reflected in a vehicle status icon 50a-c as well as other status indicators such as status symbols 52a-c indicating the status of a vehicle in a given parking spot 54a-c. In FIG. 6A, a missing vehicle in spot 54a is represented by a vehicle status icon 50a by shading icon 50a a color such as gray and/or labelling icon 50a with a missing vehicle symbol 52a. In FIG. 6B, an incorrectly parked vehicle in spot 54b is represented by an error message in the form a color red filling icon 50b and/or error symbol 52b displayed on icon 50b. In FIG. 6C, a correctly parked vehicle in spot 54c is represented by shading icon 50c a color such as white and/or placing a success symbol 52c thereon such as a checkmark. It should clearly be understood that the examples given are non-limiting and other colors, shades, symbols or messages may be used to convey the vehicle status, such as a simple word indication for example.

As shown in FIGS. 6A-C, a user may input cleaning instructions using bubbles or buttons 56a-c, including wash button 56a, rinse button 56b, and dry button 56c. A wash instruction includes covering a vehicle with detergent spray, and may automatically include a rinse instruction, as shown in FIG. 6A. This option may be selected if a user wishes to save electricity, for example, as also in the case of FIG. 6B in which a rinse only instruction is selected, which significantly reduces energy consumption and washing time as an efficient option for frequent users of the system. In FIG. 6C, a rinse and dry option is selected, whereby the dry function may also automatically include a rinse function. This option provides reduced consumption of cleaning supplies and electricity, while also providing a quicker wash cycle. Although not shown in the figures, users of the system would of course have the option to select a "full package" including the wash, rinse, and dry functions to cover the vehicle with detergent followed by rinsing with water and drying with compressed air. It is to be understood that the display of three buttons in this example is non-limiting, as more or fewer buttons may be displayed. Other buttons may be included for other conventional wash capabilities, such as applying a hot wax, conducting an additional rinse, etc.

Figure 6E:
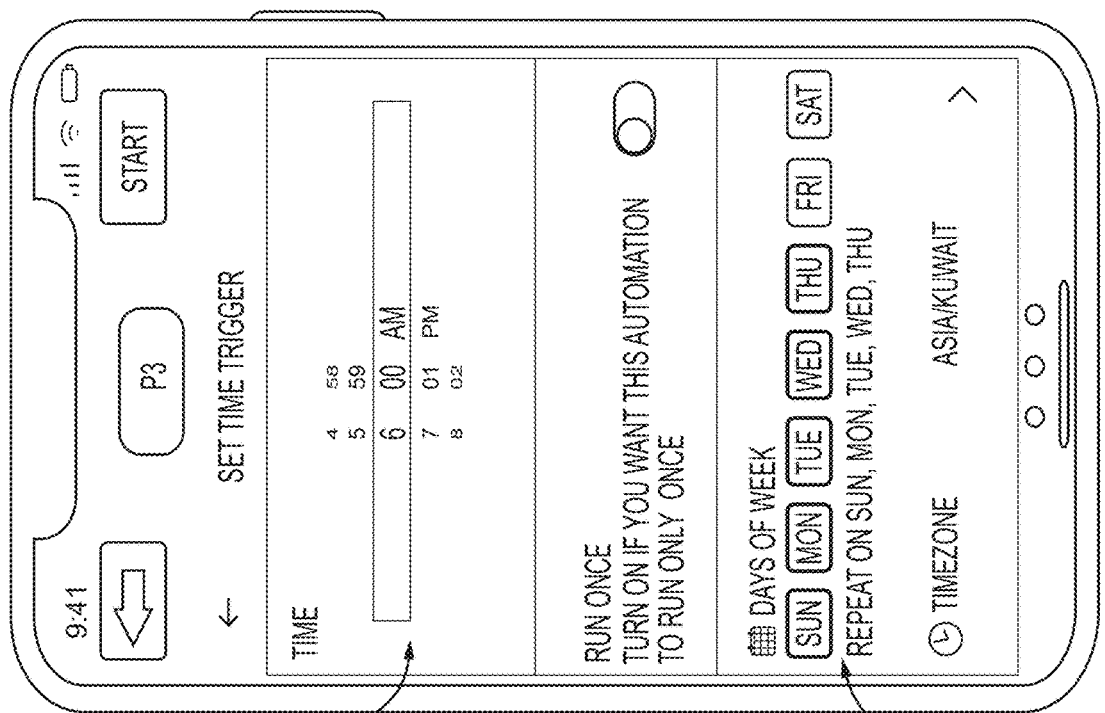
FIG. 6E is a mobile application interface for a system of automated vehicle washing with a time and date selection for cleaning operations.
Figure 6D:
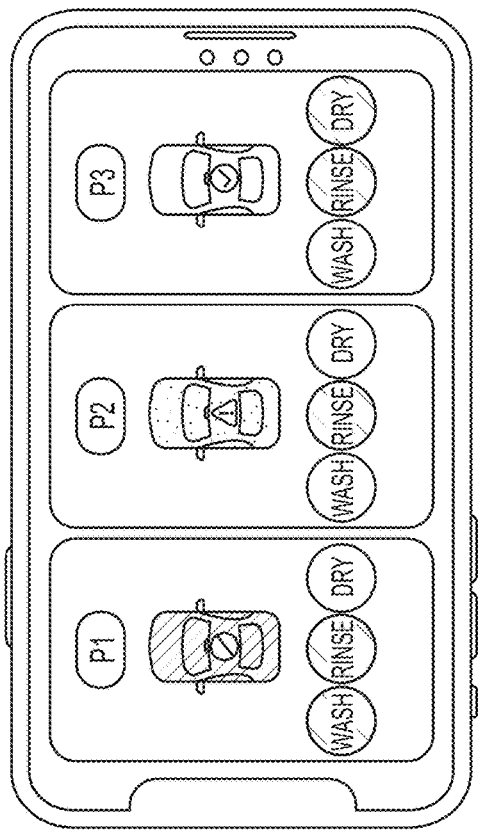
FIG. 6D is a mobile application interface for a system of automated vehicle washing with cleaning operation selections and status indication of multiple vehicles.

When using the mobile application, a user may have the option to swipe between individual vehicles and parking spaces, as shown in FIGS. 6A-C or may have the option to select cleaning instructions for all vehicles using the system on a single screen, as shown in FIG. 6D. A start time button 58 shown in FIG. 6B may be included which will prompt a user to a scheduling screen shown in FIG. 6E. On the scheduling screen a user may select a time of day 58a and days of the week 58b for cleaning operations to be performed. Such an option is beneficial, for example, in a residential installation of the washing system where a user wishes to have their vehicle cleaned on a regular schedule, but also would be beneficial in a commercial installation if the system were to be used for regular cleaning of various types of municipal vehicles on a set schedule.

It is to be understood that the systems and methods for automated washing of various vehicle types are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A system for automated vehicle washing comprising:
a source of detergent;
a source of water;
a source of compressed air;
a spray arm comprising a horizontal arm portion and a vertical arm portion joined orthogonally to each other, wherein the spray arm is configured to perform various cleaning operations on a vehicle including detergent dispensing, water rinsing and air drying, the spray arm in fluid connection to the source of detergent, source of water, and source of compressed air;
a support frame on which the spray arm is movably mounted, the support frame configured for movement of the spray arm thereon and for holding the spray arm in an elevated position;

means for two-dimensional movement of the spray arm along the support frame within a horizontal plane parallel to ground level;

means for rotational movement of the spray arm about a vertical axis;

means for vertical movement of the spray arm along the vertical axis;

a controller configured to control movement of the spray arm through control of the means for two dimensional movement, the means for rotational movement, and the means for vertical movement, wherein the controller includes a control interface comprised of at least one of a touchscreen, buttons, or switches;

at least one vehicle; and a plurality of designated parking spaces, wherein each of the plurality of designated parking spaces are underneath the support frame and are accessible to the spray arm, and wherein the at least one vehicle is parked in a parking space among the plurality of designated parking spaces, and wherein the control interface is configured to allow a user to specify which parking space from among the plurality of designated parking spaces contains the at least one vehicle, whereby the controller will control the spray arm to perform a cleaning operation on the at least one vehicle.

2. The system for automated vehicle washing as recited in claim 1, wherein the means for vertical movement of the spray arm includes a linear actuator.

3. The system for automated vehicle washing as recited in claim 1, wherein the spray arm comprises a first proximity sensor pointed downward toward the ground and mounted on the horizontal arm portion and a second proximity sensor facing forward in a direction of travel of the spray arm and mounted on the vertical arm portion of the spray arm.

4. The system for automated vehicle washing as recited in claim 3, wherein the controller is configured to control the means for vertical movement to thereby adjust a vertical position of the spray arm in response to a sensed distance between the spray arm and the at least one vehicle, whereby the vertical position of the spray arm is adjusted in correspondence to vertical contours of the at least one vehicle.

5. The system for automated vehicle washing as recited in claim 1, wherein the control interface is configured to allow a user to specify cleaning operations for the spray arm to perform on the at least one vehicle.

6. The system for automated vehicle washing as recited in claim 1, further comprising a plurality of parking spot sensors associated with the plurality of designated parking spaces, wherein the plurality of parking spot sensors are configured to sense a vehicle presence and location within the plurality of designated parking spaces.

7. The system for automated vehicle washing as recited in claim 6, wherein the control interface includes a touchscreen device and wherein the controller is programmed with a mobile application configured to allow a user to send commands to the controller through the touchscreen device.

8. The system for automated vehicle washing as recited in claim 6, wherein the parking spot sensors and controller are together configured to sense a vehicle parked incorrectly in a parking space among the plurality of designated parking spaces and generate an error message to the user through the control interface.

9. The system for automated vehicle washing as recited in claim 5, wherein the control interface allows a user to specify a day and time for the cleaning operations to be performed.

10. The system for automated vehicle washing as recited in claim 9, further comprising at least two vehicles parked in respective parking spaces from among the plurality of designated parking spaces, and wherein the control interface allows a user to specify a day and time for cleaning operations to be performed on the at least two vehicles.

11. A system for automated vehicle washing comprising:

a source of detergent;

a source of water;

a source of compressed air;

a spray arm comprising a horizontal arm portion having a downward facing proximity sensor mounted thereon and a vertical arm portion with a forward facing proximity sensor mounted thereon, the horizontal arm portion and vertical arm portion joined orthogonally to each other, wherein the spray arm is configured to perform various cleaning operations on a vehicle including detergent dispensing, water rinsing and air drying, the spray arm in fluid connection to the source of detergent, source of water, and source of compressed air;

a support frame on which the spray arm is movably mounted and wherein the support frame is configured for holding the spray arm in an elevated position thereon;

means for two-dimensional movement of the spray arm along the support frame within a horizontal plane parallel to ground level;

means for rotational movement of the spray arm about a vertical axis;

means for vertical movement of the spray arm along a vertical axis; and a controller configured to control the means for two dimensional movement, the means for rotational movement, and the means for vertical movement, wherein the controller includes a control interface comprised of at least one of a touchscreen, buttons, or switches;

at least one vehicle; and a plurality of designated parking spaces, wherein the at least one vehicle is parked in a parking space among the plurality of designated parking spaces, wherein each of the plurality of designated parking spaces are underneath the support frame and are accessible to the spray arm and wherein the control interface is configured to allow a user to specify which parking space from among the plurality of designated parking spaces contains the at least one vehicle, whereby the controller will control the spray arm to perform a cleaning operation on the at least one vehicle.

12. The system for automated vehicle washing as recited in claim 11, wherein the control interface includes a touchscreen device and wherein the controller is programmed with a mobile application configured to allow a user to send commands to the controller through the touchscreen device.

13. The system for automated vehicle washing as recited in claim 12, wherein the means for vertical movement of the spray arm includes a linear actuator.

14. The system for automated vehicle washing as recited in claim 11 further comprising a plurality of parking spot sensors configured to sense the at least one vehicle presence and location among the plurality of designated parking spaces.

15. The system for automated vehicle washing as recited in claim 11, wherein the at least one vehicle has a height between about 12 ft and about 14 ft.

16. The system for automated vehicle washing as recited in claim 11, wherein the at least one vehicle has a height between about 3.8 ft and about 4.2 ft.

17. The system for automated vehicle washing as recited in claim 1, wherein the at least one vehicle includes a first vehicle parked in a first parking space among the plurality of designated parking spaces, and a second vehicle parked in a second parking space among the plurality of designated parking spaces, and wherein the control interface allows a user to enter commands to the controller to direct the spray arm to perform a cleaning operation on the first vehicle and the second vehicle.

18. The system for automated vehicle washing as recited in claim 11, wherein the at least one vehicle includes a first vehicle parked in a first parking space among the plurality of designated parking spaces, and a second vehicle parked in a second parking space among the plurality of designated parking spaces, and wherein the control interface allows a user to enter commands to the controller to direct the spray arm to perform a cleaning operation on the first vehicle and the second vehicle.

\* \* \* \* \*